(12) United States Patent
Wu

(10) Patent No.: US 8,459,979 B2
(45) Date of Patent: Jun. 11, 2013

(54) APPARATUS FOR MOLDING OPTICAL FIBER CONNECTOR

(75) Inventor: Kun-Chan Wu, Taipei Hsien (TW)

(73) Assignee: Hon Hai Precision Industry Co., Ltd., New Taipei (TW)

(*) Notice: Subject to any disclaimer, the term of this patent is extended or adjusted under 35 U.S.C. 154(b) by 326 days.

(21) Appl. No.: 12/978,353

(22) Filed: Dec. 23, 2010

(65) Prior Publication Data

US 2011/0262582 A1  Oct. 27, 2011

(30) Foreign Application Priority Data

Apr. 21, 2010  (TW) .................................. 99112449

(51) Int. Cl.
*B29C 45/26* (2006.01)
(52) U.S. Cl.
USPC ............ 425/190; 425/588; 425/468; 249/184
(58) Field of Classification Search
USPC ........................... 425/190, 588, 468; 249/184
See application file for complete search history.

(56) References Cited

U.S. PATENT DOCUMENTS

| 4,330,171 | A | * | 5/1982 | Malsot et al. | 385/80 |
| 5,707,565 | A | * | 1/1998 | Suzuki et al. | 264/1.25 |
| 5,780,079 | A | * | 7/1998 | Lee | 425/577 |
| 6,074,577 | A | * | 6/2000 | Katsura et al. | 264/1.25 |
| 6,129,865 | A | * | 10/2000 | Jeong et al. | 264/1.25 |
| 6,264,375 | B1 | * | 7/2001 | Ohtsuka et al. | 385/78 |
| 6,342,170 | B1 | * | 1/2002 | Yang | 264/1.25 |
| 6,663,377 | B1 | * | 12/2003 | Dean et al. | 425/190 |
| 6,719,927 | B2 | * | 4/2004 | Sakurai et al. | 264/1.25 |
| 7,412,130 | B2 | * | 8/2008 | Harness et al. | 385/31 |

* cited by examiner

*Primary Examiner* — James Sanders
(74) *Attorney, Agent, or Firm* — Altis Law Group, Inc.

(57) ABSTRACT

An apparatus is provided for molding an optical fiber connector. The optical fiber connector includes a main body and a lens portion. The apparatus includes a molding cavity, an insert and a block in the molding cavity. The insert forms a blind hole of the main body. The block forms a recess of the main body. The molding cavity includes a central portion for forming the main body, a lens-forming portion for forming the lens portion, and two lateral portions for forming corresponding lateral surfaces of the main body. The molding cavity includes a gate for introducing molding material into the molding cavity therethrough. The gate is connected to an end of one of the lateral portions distal from the lens-forming portion. The block is positioned in the other end of said one of the lateral portions distal from the gate.

3 Claims, 3 Drawing Sheets

APPARATUS FOR MOLDING OPTICAL FIBER CONNECTOR

BACKGROUND

1. Technical Field

The present disclosure relates to an apparatus for molding an optical fiber connector.

2. Description of Related Art

Optical fiber connectors often include at least one blind hole and at least one lens integrated with the at least one blind hole. Each blind hole is behind a lens. The blind hole is used to receive an optical fiber to couple it with the lens to transform optical signals. An injection molding apparatus having a molding cavity is used to manufacture the optical fiber connectors, and an insert for molding the blind hole is defined in the molding cavity. A gate for inputting material of the optical fiber connector is defined in a middle-portion of the molding cavity. The shape and size of the gate must be within strict tolerances; otherwise, the optical fiber connector may not perform to standard. However, the above method cannot reliably produce the gate to desired tolerances.

BRIEF DESCRIPTION OF THE DRAWINGS

Many aspects of the present apparatus for molding optical fiber connector can be better understood with reference to the following drawings. The components in the drawings are not necessarily drawn to scale, the emphasis instead being placed upon clearly illustrating the principles of the present apparatus for molding optical fiber connector. Moreover, in the drawings, like reference numerals designate corresponding parts throughout the several views.

DETAILED DESCRIPTION

Embodiments of the present apparatus for molding optical fiber connectors will now be described in detail below and with reference to the drawings.

Figure 1:
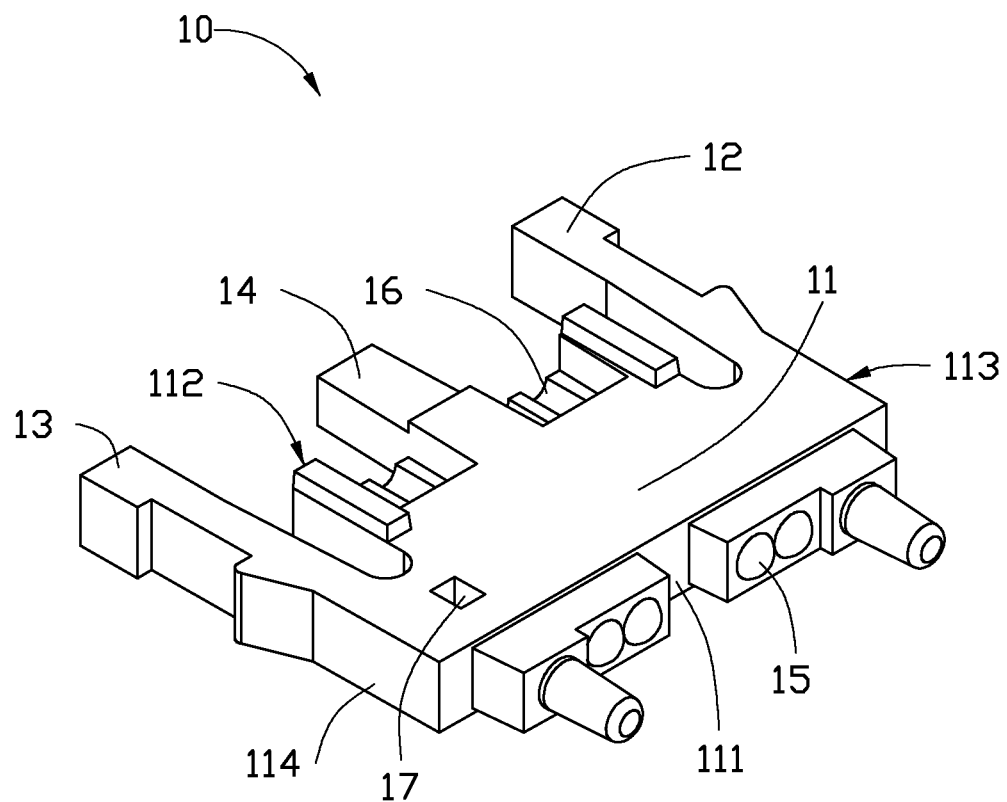
FIG. 1 is a schematic view of an optical fiber connector.
Figure 2:
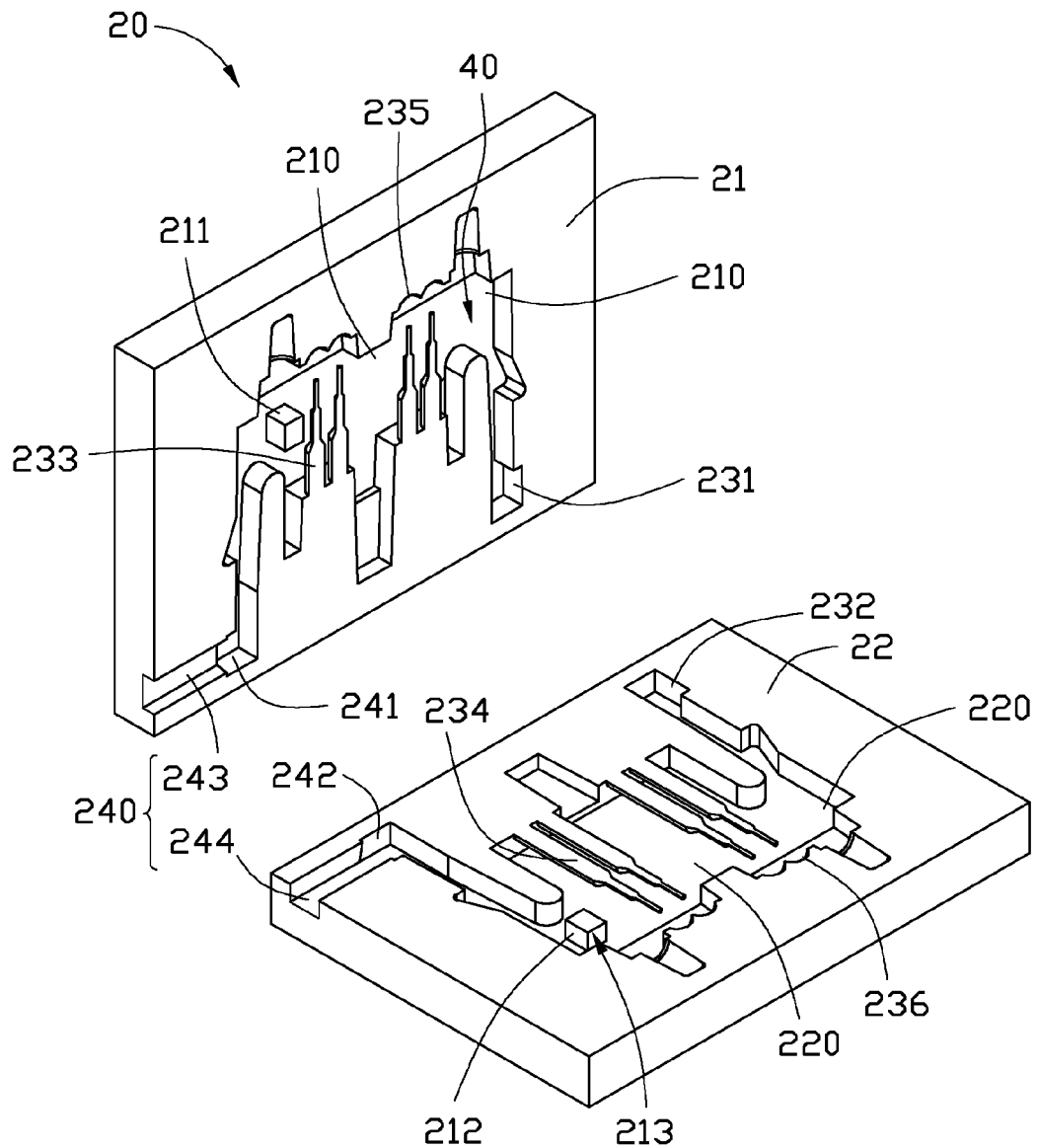
FIG. 2 is a schematic view of an apparatus for molding the optical fiber connector shown in FIG. 1, according to a first embodiment.

Referring to FIG. 1 and FIG. 2, an apparatus 20 for molding an optical fiber connector 10, according to a first embodiment, is shown.

The optical fiber connector 10 includes a main body 11, four lens portions 15, a first arm 12, a second arm 13, and a middle arm 14. The first arm 12, the second arm 13, and the middle arm 14 extend from the main body 11. The first arm 12 and the second arm 13 are located at opposite sides of the main body 11. The middle arm 14 is located between the first arm 12 and the second arm 13. The connector 10 has a recess 17 located between the second arm 13 and the main body 11. In this embodiment, the recess 17 is a through hole. The first arm 12, the second arm 13 and the middle arm 14 are configured to hold the optical fiber connector 10 in place.

The main body 11 includes a first side surface 111, a second side surface 112 opposite to the first side surface 111, a third side surface 113, and a forth side surface 114 opposite to the third side surface 113. The first side surface 111 is connected to the third side surface 113 and the forth side surface 114. The four lens portions 15 are formed on the first side surface 111. The middle arm 14 extends from the second side surface 112. Four blind holes 16 are defined in the second side surface 112 and each blind hole 16 extends from the second side surface 112 to the first side surface 111. Two of the four blind holes 16 are located between the first arm 12 and the middle arm 14. Another two of the blind holes 16 are located between the second arm 13 and the middle arm 14. Each of the blind holes 16 is configured to receive an optical fiber. Each of the lens portions 15 is aligned with a corresponding blind hole 16 and is optically coupled to the optical fiber received in the blind hole 16.

The first arm 12 and the second arm 13 extend from the second side surface 112 in the direction away from the lens portions 15. The first arm 12 and the second arm 13 are available for grasping by a user when manipulating the connector 10.

In applications where grasping portions are not needed or can be otherwise designed, the first arm 12, the second arm 13 and the middle arm 14 may be omitted.

The apparatus 20 includes an upper molding plate 21, a lower molding plate 22 and a block 213. The upper molding plate 21 includes an upper middle cavity 210, a first upper cavity 231, a second upper cavity 241, four first mold cores 233, a first groove 243 and a first lens-forming portion 235. The lower molding plate 22 includes a lower middle cavity 220, a first lower cavity 232, a second lower cavity 242, four second mold cores 234, a second groove 244 and a second lens-forming portion 236. The block 213 includes a first portion 211 formed on the upper molding plate 21 and a second portion 212 formed on the lower molding plate 22.

When bonded together, the upper molding plate 21 and the lower molding plate 22 cooperatively form a molding cavity 40. The molding cavity 40 includes a central cavity, a lens-forming cavity, two lateral cavities and a gate 240. The central cavity is formed by cooperation of the upper middle cavity 210 and the lower middle cavity 220 and is configured to form the main body 11 and the middle arm 14 of the connector 10. The lens forming cavity is formed by cooperation of the first lens-forming portion 235 and the second lens-forming portion 236 and is configured to form the lens portions 15. One of the lateral cavities is formed by cooperation of the first upper cavity 231 and the first lower cavity 232 and is configured to form the first arm 12. Another one of the lateral cavities is formed by cooperation of the second upper cavity 241 and the second lower cavity 242 and is configured to form the second arm 13. Four inserts are formed by cooperation of the first mold cores 233 and the second mold cores 234 and are configured to form the four blind holes 16. The four inserts are located in the central cavity.

The block 213 is formed by cooperation of the first portion 211 and second portion 212 and is configured to form the recess 17. The first and second grooves 243, 244 cooperatively constitute the gate 240. The gate 240 is configured to allow molding material to be introduced into the molding cavity therethrough. The gate 240 is connected to an end of the lateral cavity to form the second arm 13 distal from the lens forming cavity. The block 213 is positioned in the other end of the lateral cavity to form the second arm 13 distal from the gate 240. Therefore, when introduced into the molding cavity, the molding material can be slowed down by the block 213, thereby reducing an impact force of the molding material against distal ends of the inserts in the central cavity. Thus, the alignment accuracy between the longitudinal axis of the blind hole 16 and the optical axis of the corresponding lens portion 15 in the optical fiber connector 10 molded by the apparatus 20 is improved.

In the injection process, the material for forming the optical fiber connector 10 flows into the molding cavity 40 through the gate 240, and then the optical fiber connector 10 is molded.

Figure 3:
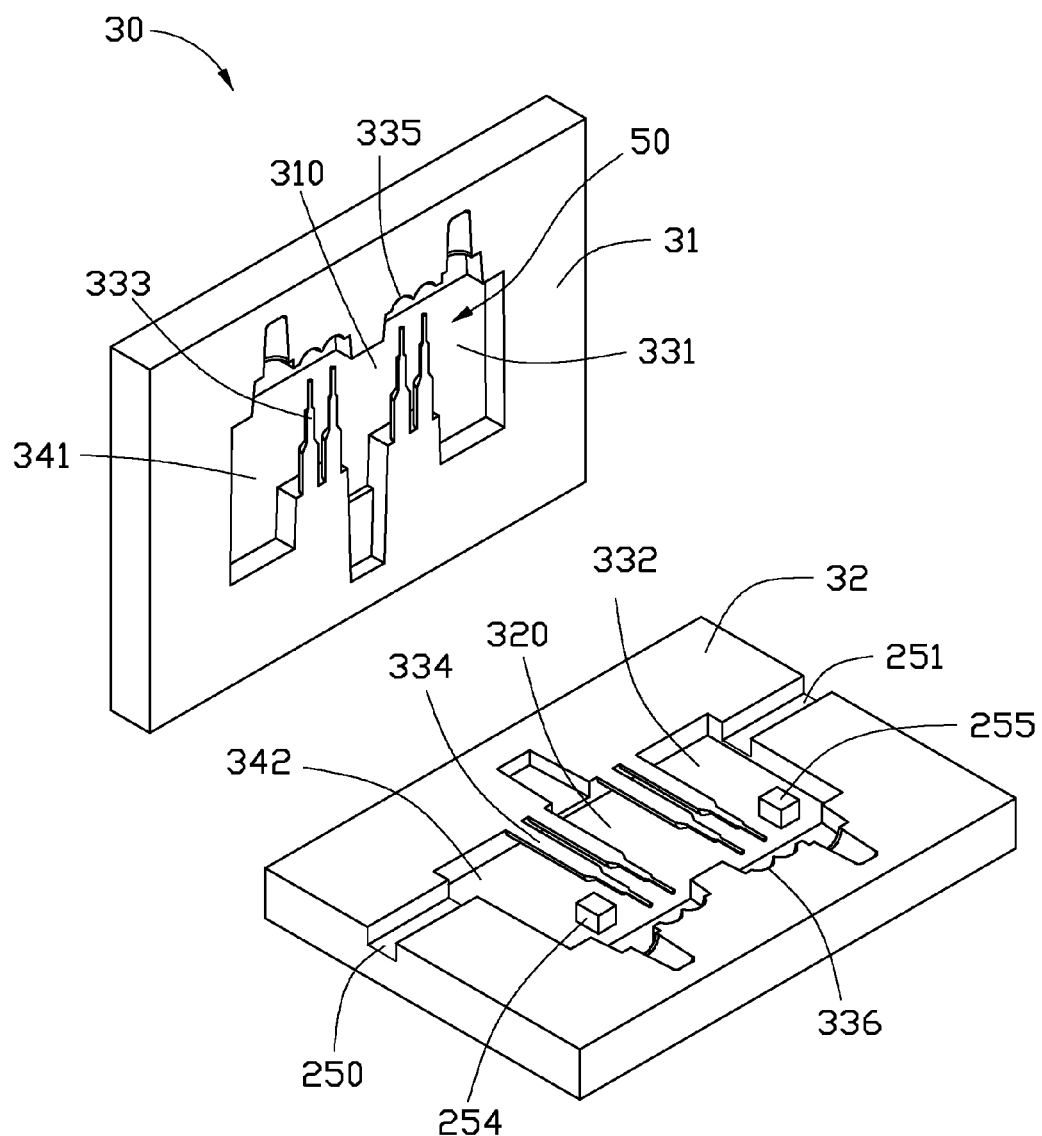
FIG. 3 is a schematic view of an apparatus for molding an optical fiber connector, according to a second embodiment.

Referring to FIG. 3, an apparatus 30 for molding an optical fiber connector, according to a second embodiment, is shown.

The apparatus 30 includes an upper molding plate 31, a lower molding plate 32, a first block 254 and a second block 255. The upper molding plate 31 includes an upper middle cavity 310, a first upper cavity 331, a second upper cavity 341, four first mold cores 333, and a first lens-forming portion 335. The lower molding plate 32 includes a lower middle cavity 320, a first lower cavity 332, a second lower cavity 342, four second mold cores 334, a first groove 250, a second groove 251, and a second lens-forming portion 336. The first groove 250 is connected to an end of the second lower cavity 342 distal from the second lens-forming portion 336. The second groove 251 is connected to an end of the first lower cavity 332 distal from the second lens-forming portion 336. The first and second blocks 254, 255 are positioned on the lower molding plate 22. Heights of the first and second blocks 254, 255 are substantially equal to a depth of the first lower cavity 332.

When bonded together, the upper molding plate 31 and the lower molding plate 32 cooperatively form a molding cavity 50. The molding cavity 50 includes a central cavity, a lens-forming cavity, two lateral cavities, and two gates. The central cavity is formed by cooperation of the upper middle cavity 310 and the lower middle cavity 320 and is configured to form a main body and a middle arm of the optical fiber connector. The lens forming cavity is formed by cooperation of the first lens-forming portion 335 and the second lens-forming portion 336 and is configured to form lens portions of the connector. One of the lateral cavities is formed by cooperation of the first upper cavity 331 and the first lower cavity 332 and is configured to form a lateral surface of the connector. Another one of the lateral cavities is formed by cooperation of the second upper cavity 341 and the second lower cavity 342 and is configured to form another lateral surface of the connector. The two lateral surfaces of the connector are positioned at opposite sides of the connector and are substantially parallel to blind holes of the connector. Four inserts are formed by cooperation of the first mold cores 333 and the second mold cores 334 and configured to form the blind holes of the connector. The four inserts are located in the central cavity.

When the upper molding plate 31 is attached to the lower molding plate 32 to cover the first groove 250, the first groove 250 is configured to function as a first gate. The first gate is connected to an end of one of the lateral cavities distal from the lens-forming portion 336. The first block 254 is positioned in the other end of the one of the lateral cavities distal from the first gate and is configured to form a first recess of the connector. When the upper molding plate 31 is attached to the lower molding plate 32 to cover the second groove 251, the second groove 251 is configured to function as a second gate. The second gate is connected to an end of another one of the lateral cavities distal from the lens forming portion 336. The second block 255 is positioned in the other end of the another one of the lateral cavities distal from the second gate and is configured to form a second recess of the connector. In this embodiment, the first and second recesses are blind holes.

Advantages of the apparatus 30 of this embodiment are the same as those of the apparatus 20 of the first embodiment.

It is to be understood that in other embodiments, the apparatus 30 may have one gate and one block when desired tolerances can be met for a particular application environment with just one gate.

It is understood that the above-described embodiments are intended to illustrate rather than limit the disclosure. Variations may be made to the embodiments and methods without departing from the spirit of the disclosure. Accordingly, it is appropriate that the appended claims be construed broadly and in a manner consistent with the scope of the disclosure.

What is claimed is:

1. An apparatus for molding an optical fiber connector, the optical fiber connector including a main body, a lens portion, two arms extending from the main body, and a recess, the arms located at opposite sides of the main body, the recess located between one of the arms and the main body, the main body having a blind hole for receiving an optical fiber, the lens portion aligned with the blind hole, the apparatus comprising a molding cavity, an insert and a block, the insert configured to form the blind hole, the block configured to form the recess, the apparatus comprising an upper molding plate and a lower molding plate, both of the upper molding plate and the lower molding plate cooperatively defining the molding cavity, the block comprising a first portion formed on the upper molding plate and a second portion formed on the lower molding plate, the molding cavity including a central portion configured to form the main body, a lens-forming portion configured to form the lens portion, and two lateral portions configured to form the corresponding arms, the molding cavity comprising a gate for introducing molding material into the molding cavity therethrough, the gate connected to an end of one of the lateral portions distal from the lens-forming portion, the block positioned in the other end of the one of the lateral portions distal from the gate.

2. The apparatus of claim 1, wherein the upper molding plate includes a first groove and the lower molding plate includes a second groove, the first and second grooves cooperatively constituting the gate.

3. The apparatus of claim 2, wherein the first and second grooves extend in a direction distinct from lengthwise directions of the lateral portions.

* * * * *